No. 769,352. PATENTED SEPT. 6, 1904.
J. J. MALLY.
DRIVE WHEEL FOR TRACTION ENGINES.
APPLICATION FILED MAR. 7, 1904.
NO MODEL.
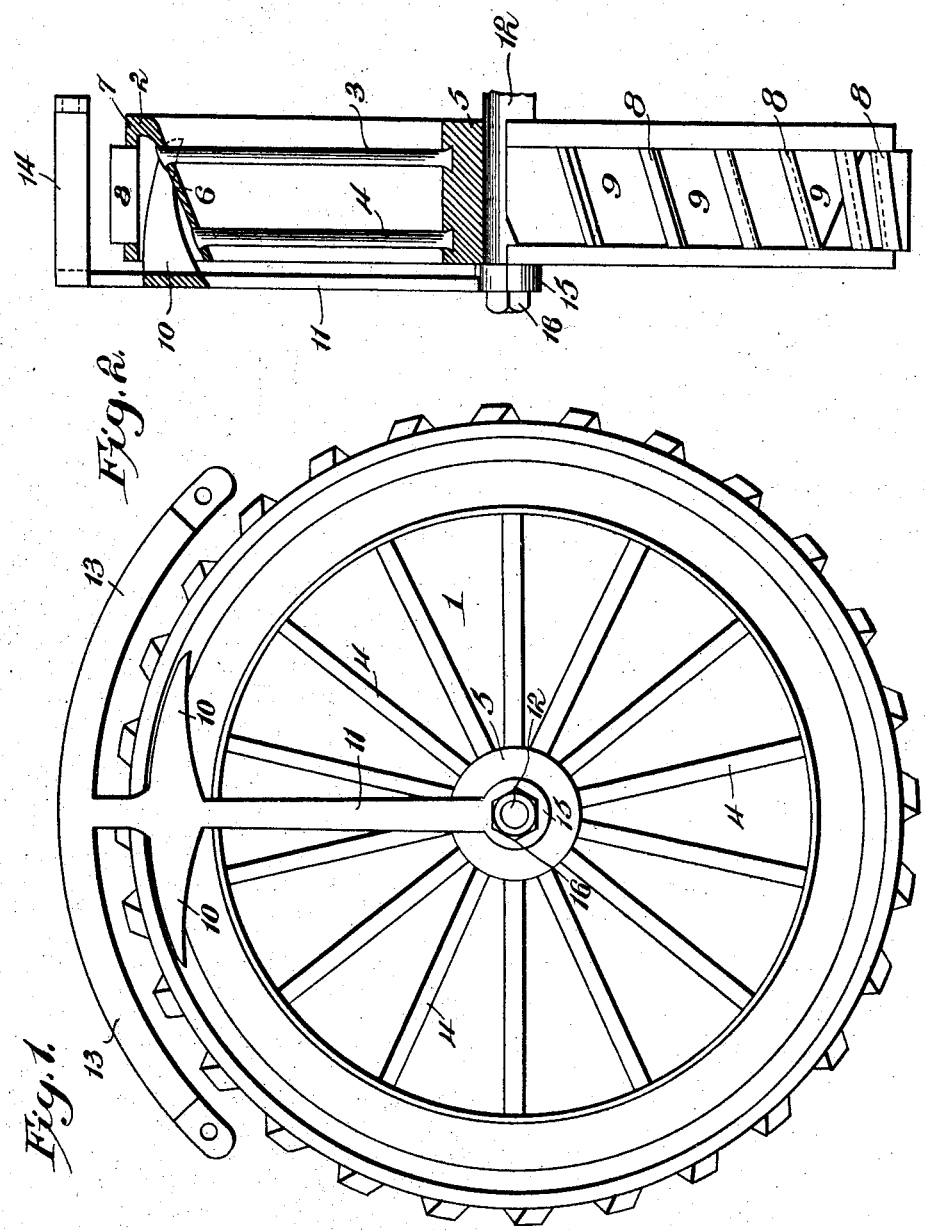
Joseph J. Mally, Inventor No. 769,352. Patented September 6, 1904.

UNITED STATES PATENT OFFICE.

JOSEPH J. MALLY, OF FRANKLIN TOWNSHIP, BUTLER COUNTY, NEBRASKA.

DRIVE-WHEEL FOR TRACTION-ENGINES.

SPECIFICATION forming part of Letters Patent No. 769,352, dated September 6, 1904.

Application filed March 7, 1904. Serial No. 197,038. (No model.)

*To all whom it may concern:*

Be it known that I, JOSEPH J. MALLY, a citizen of the United States, residing in Franklin township, in the county of Butler and State of Nebraska, have invented a new and useful Drive-Wheel for Traction-Engines, of which the following is a specification.

The invention relates to improvements in traction-wheels.

The object of the present invention is to improve the construction of traction-wheels and to provide a simple, inexpensive, and efficient wheel of this character designed especially for use as a drive-wheel on traction-engines and adapted to enable an engine of this character to operate effectively where the soil is soft and moist and capable of preventing mud and debris from accumulating on its periphery.

A further object of the invention is to provide a wheel of this character from which all accumulation will be positively removed and which will be braced and supported, whereby it will be adapted to sustain the weight and strain to which it is subjected.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of a traction-wheel constructed in accordance with this invention. Fig. 2 is an end elevation of the same, partly in section.

Like numerals of reference designate corresponding parts in all the figures of the drawings.

1 designates a traction-wheel designed particularly for use as a drive-wheel for traction-engines and provided with a rim 2, which is connected by inner and outer spokes 3 and 4 with a hub 5. The hub and the spokes may be of any desired construction, and the rim 2 is composed of inner and outer circular portions 6 and 7, connected at the inner side or edge of the rim and spaced apart at the outer side or edge of the same to form an intervening annular groove or way. The inner annular portion 6, which is imperforate, is arranged at an acute angle to the outer portion, which is provided with transversely-disposed spurs or projections 8, set at an angle, as clearly shown in Fig. 2, and adapted to prevent the wheel from slipping. The ribs or projections extend substantially across the rim of the wheel, and the outer portion 7 is open between the ribs or projections to provide enlarged openings 9 for the purpose of permitting any mud or other accumulation to pass freely through the outer portion of the rim of the wheel into the intervening annular groove or passage, whereby such mud and accumulation are prevented from adhering to the periphery of the wheel.

The angularly-disposed inner portion 6 of the rim of the wheel presents a smooth inclined inner face from which mud and accumulation are readily removed by means of a pair of scrapers 10, mounted on a support or brace 11 and extending into the annular groove or space which tapers inwardly. The scrapers consist of tapering portions or blades which conform generally to the configuration of the inner and outer walls of the annular groove or passage of the wheel and which extend from the center of the top of the wheel to opposite sides thereof, whereby they are capable of scraping the mud and other accumulation from the passage when the wheel is rotated in either direction. The blades or scrapers 10 are set at an angle to the axle 12 of the wheel and diverged inwardly. The brace consists of an upright portion and a pair of oppositely-disposed arms 13, which are located above the wheel and which are curved and arranged concentric with the same, as clearly shown in Fig. 1. The outer ends of the arms are provided with lateral extensions or portions 14, which are designed to be secured to the boiler of the engine or other relatively fixed portion thereof. The lower end 15 of the brace 11 is enlarged and provided with an opening through which passes the outer end of the spindle of the axle 12. The lower end of the brace is secured to the axle by means of the axle-nut 16. The brace which forms a support for the scraper strengthens and supports the axle and enables the wheel to bear the weight of the engine.

The inner and outer portions of the rim and the spurs or projections of the outer portion are cast in one piece. The outer portion of the rim constitutes the tread of the wheel, and the scrapers are operated at the inner face or periphery of the tread for discharging the accumulation at the outer side of the wheel. The tread and the inner portion of the rim present smooth inner faces or walls to the scrapers.

Having thus fully described my invention, what I claim as new, and desire to secure by Letters Patent, is—

1. A wheel of the class described provided at its rim with an annular groove or way and having peripheral openings communicating with the groove or way.

2. A wheel of the class described provided at its rim with an annular groove or way and having peripheral openings communicating with the groove or way, and means for positively removing accumulation from the groove or way.

3. A wheel of the class described provided at its rim with an annular groove or way and having peripheral openings communicating with the groove or way, and a scraper operating in the groove or way for removing accumulation therefrom.

4. A wheel of the class described provided at its rim with an annular groove or way and having peripheral openings communicating with the groove or way, and a relatively fixed scraper extending into the groove or way and arranged at an angle.

5. A wheel of the class described provided at its rim with an annular groove or way and having peripheral openings communicating with the groove or way, and inwardly-diverging scrapers set at an angle and extending into the groove or way.

6. A wheel of the class described provided at its rim with an annular groove or way and having peripheral openings communicating with the groove or way, and a fixed brace connected with the axle and designed to be secured to a fixed portion of the engine and provided with a scraper extending into the groove or way.

7. A wheel of the class described provided at its rim with an annular groove or way and having peripheral openings communicating with the groove or way, a vertical brace mounted on the axle of the wheel and extending from the top thereof and provided above the same with curved arms designed to be fixed to an engine, and means carried by the brace for removing accumulation from the groove or way.

8. The combination of a wheel provided at its periphery with an annular series of openings for the passage of accumulation, and relatively fixed means operating within the periphery of the wheel for removing accumulation from the latter.

9. The combination of a wheel provided in its tread with openings for the passage of accumulation, and means operating at the inner face of the tread of the wheel for removing accumulation from the latter.

10. The combination of a wheel provided in its tread with openings for the passage of accumulation, and a relatively fixed scraping device operating at the inner face of the tread of the wheel for removing accumulation from the latter.

11. The combination of a wheel provided at its periphery with openings for the passage of accumulation and having an annular way open at one side of the wheel, and means for removing accumulation from the said way.

12. A wheel of the class described provided at its periphery with openings and having an annular groove or way arranged to receive the accumulation, said groove or way being open at one side of the wheel and being inwardly tapered.

13. A wheel of the class described provided at its rim with an annular groove or way having an inner inclined wall and open at one side of the wheel, said wheel being provided at its periphery with openings communicating with the said groove or way.

14. A wheel of the class described having a rim composed of inner and outer portions connected at one side of the wheel and spaced apart at the other, the outer portion of the wheel being provided with openings.

15. A wheel of the class described provided with a rim composed of inner and outer portions spaced apart at one side of the wheel to form an annular groove or way, the outer portion of the rim being provided with transverse spurs or projections and having open spaces between the same to permit accumulation to pass from the periphery of the wheel to the said groove or way.

In testimony whereof I have signed my name to this specification in the presence of two subscribing witnesses.

JOSEPH J. MALLY.

In presence of—
L. S. HASTINGS,
CHAS. J. ZERZAN.